US009995047B2

(12) United States Patent
Raman et al.

(10) Patent No.: US 9,995,047 B2
(45) Date of Patent: Jun. 12, 2018

(54) CONSTRUCTION BOARD INSTALLATION ROBOT

(71) Applicant: Integrated Construction Enterprises, Inc., Belleville, NJ (US)

(72) Inventors: Sreenivas Raman, Park Ridge, NJ (US); Elie Cherbaka, Franklin Lakes, NJ (US); Ryan J. Giovacchini, Hamilton, NJ (US); Brian Jennings, Paramus, NJ (US); Thomas C. Slater, New York, NY (US)

(73) Assignee: Integrated Construction Enterprises, Inc., Belleville, NJ (US)

( * ) Notice: Subject to any disclaimer, the term of this patent is extended or adjusted under 35 U.S.C. 154(b) by 0 days. days.

(21) Appl. No.: 15/178,563

(22) Filed: Jun. 9, 2016

(65) Prior Publication Data

US 2017/0114553 A1    Apr. 27, 2017

Related U.S. Application Data

(60) Provisional application No. 62/173,348, filed on Jun. 9, 2015.

(51) Int. Cl.
| | |
|---|---|
| *G05B 19/04* | (2006.01) |
| *E04F 21/18* | (2006.01) |
| *B25J 19/02* | (2006.01) |
| *B25J 5/00* | (2006.01) |
| *B25J 9/16* | (2006.01) |
| *G05D 1/02* | (2006.01) |

(52) U.S. Cl.
CPC .............. *E04F 21/18* (2013.01); *B25J 5/007* (2013.01); *B25J 9/1664* (2013.01); *B25J 9/1676* (2013.01); *B25J 19/022* (2013.01); *G05D 1/0214* (2013.01)

(58) Field of Classification Search
CPC ........ B25J 19/022; B25J 5/007; B25J 9/1664; B25J 9/1676; E04F 21/18; G05D 1/0214
USPC ........................................................ 700/255
See application file for complete search history.

(56) References Cited

U.S. PATENT DOCUMENTS

| | | | |
|---|---|---|---|
| 9,427,874 B1* | 8/2016 | Rublee ................... | B25J 9/1697 |
| 9,720,414 B1* | 8/2017 | Theobald ............... | G05D 1/021 |
| 2012/0279142 A1* | 11/2012 | Michaud ............. | E04L 31/3442 52/79.5 |
| 2013/0119033 A1* | 5/2013 | Lipnevicius ........... | B23K 37/02 219/130.1 |
| 2015/0050111 A1* | 2/2015 | Townsend ................ | B25J 5/007 414/738 |

(Continued)

*Primary Examiner* — Harry Y Oh
(74) *Attorney, Agent, or Firm* — Brient IP Law, LLC

(57) ABSTRACT

A construction board installation robot comprises a frame with attached devices to securely hold and subsequently affix to a substructure a construction board, a robotic system consisting multiple joints and links to position the frame, and a cart containing ancillary equipment needed for the completion of the desired task and the ability to move and position the entire assembly under its own power. Positioning is determined dynamically utilizing a series of laser scanners and optical sensors. To assist a laborer with the mounting of boards, the arm and cart are capable of being easily maneuvered either through the use of integrated sensors that direct the actuation of the arm and/or cart wheels as determined by the push or pull of the operator on the device, a method of remote control, and/or independently with control software.

16 Claims, 5 Drawing Sheets

(56) References Cited

U.S. PATENT DOCUMENTS

2016/0320765 A1* 11/2016 Carberry ............... G05B 15/02

* cited by examiner

CONSTRUCTION BOARD INSTALLATION ROBOT

CROSS-REFERENCES TO RELATED APPLICATIONS

This application claims the benefit of United States Provisional Application For Patent, Ser. No. 62/173,348, filed Jun. 9, 2015 and whose contents are incorporated by reference herein in their entirety.

FIELD OF THE INVENTION

Embodiments of the present invention include construction board installation apparatus, and more specifically, apparatus to automate the installation of construction boards.

BACKGROUND OF THE INVENTION

Gypsum board or drywall is widely used to create a finish surface for interior walls and ceilings, while sheathing is often used to create a surface for roofing materials. Hanging drywall and installing sheathing during the construction or renovation of buildings is commonplace, arduous, and repetitive.

Current installation practice for drywall is as follows: teams of laborers lift large, heavy sheets of gypsum board and carefully position them against the wall, often at height. A laborer must then affix the board to the structure of the wall. After an appropriate location is determined, usually where a screw will land in a wall stud, the laborer can drive in the screw. Many tens of screws are required to securely mount a board. The entire process is slow and exposes laborers to the possibility of repetitive stress injury. The process for placement of sheeting is similar and just as arduous and dangerous.

The installation of drywall, sheathing, and other construction boards would both benefit enormously from the use of a device that could, in conjunction with the guidance of a person or independently, place and either fully or partially attach the board to the underlying structure. The device would greatly reduce the strength required to maneuver the large and unwieldy boards and increase worker productivity.

BRIEF SUMMARY OF THE INVENTION

An object of the present invention is apparatus to assist in the installation of a construction board, such as drywall, sheathing, and plywood.

Another object of the present invention is apparatus to assist in the transport of such construction boards to a chosen installation location.

Yet another object of the present invention is apparatus to assist in the placement of such construction boards at a chosen installation location.

Still another object of the present invention is apparatus to automate the installation of such construction boards.

An embodiment of the present invention comprises a frame with attached devices to securely hold and subsequently affix to a substructure a construction board, a robotic system consisting multiple joints and links to position the frame, and a cart containing ancillary equipment needed for the completion of the desired task and the ability to move and position the entire assembly under its own power. Positioning is determined dynamically utilizing a series of laser scanners and optical sensors. To assist a laborer with the mounting of boards, the arm and cart are capable of being easily maneuvered either through the use of integrated sensors that direct the actuation of the arm and/or cart wheels as determined by the push or pull of the operator on the device, a method of remote control, and/or independently with control software.

DESCRIPTION OF THE INVENTION

Figure 2:
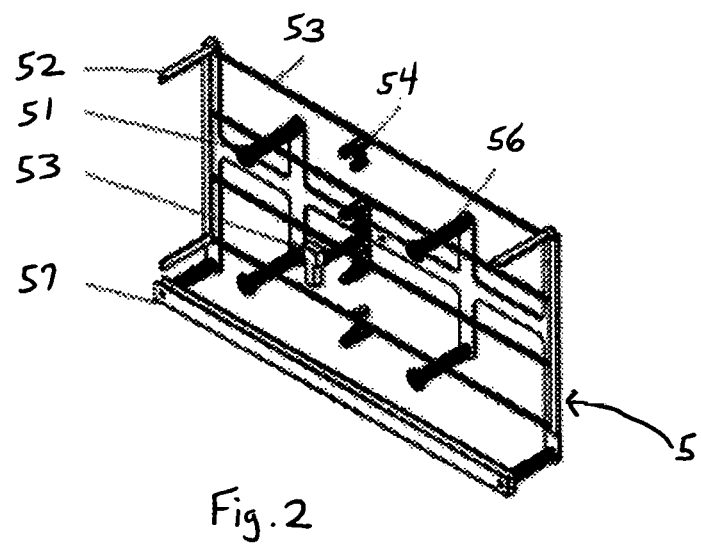
FIG. 2 is a corner view of the embodiment shown in FIG. 1.
Figure 1:
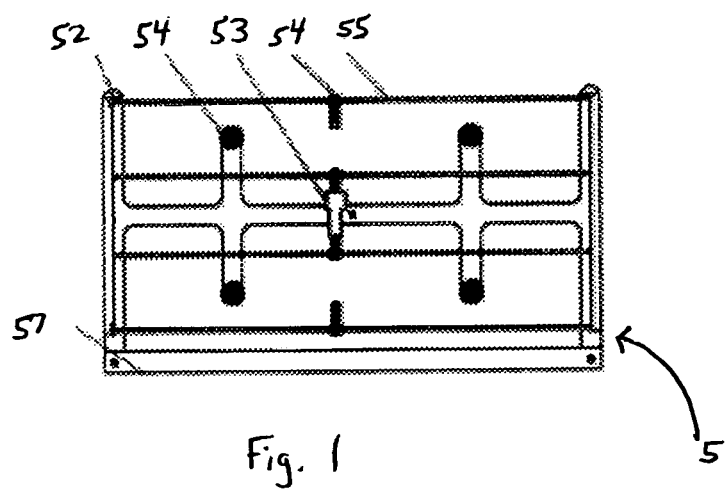
FIG. 1 is a side view of an embodiment of the frame of the invention.
Figure 3:
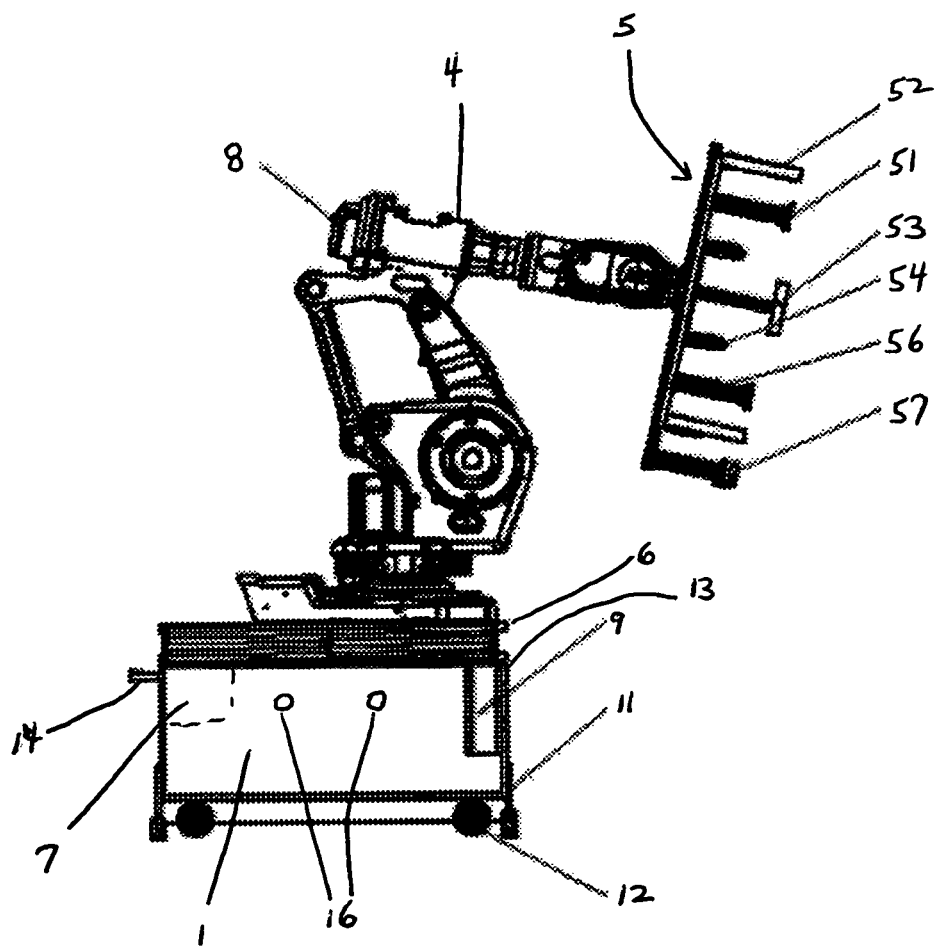
FIG. 3 is a side view of an embodiment of the invention.
Figure 4:
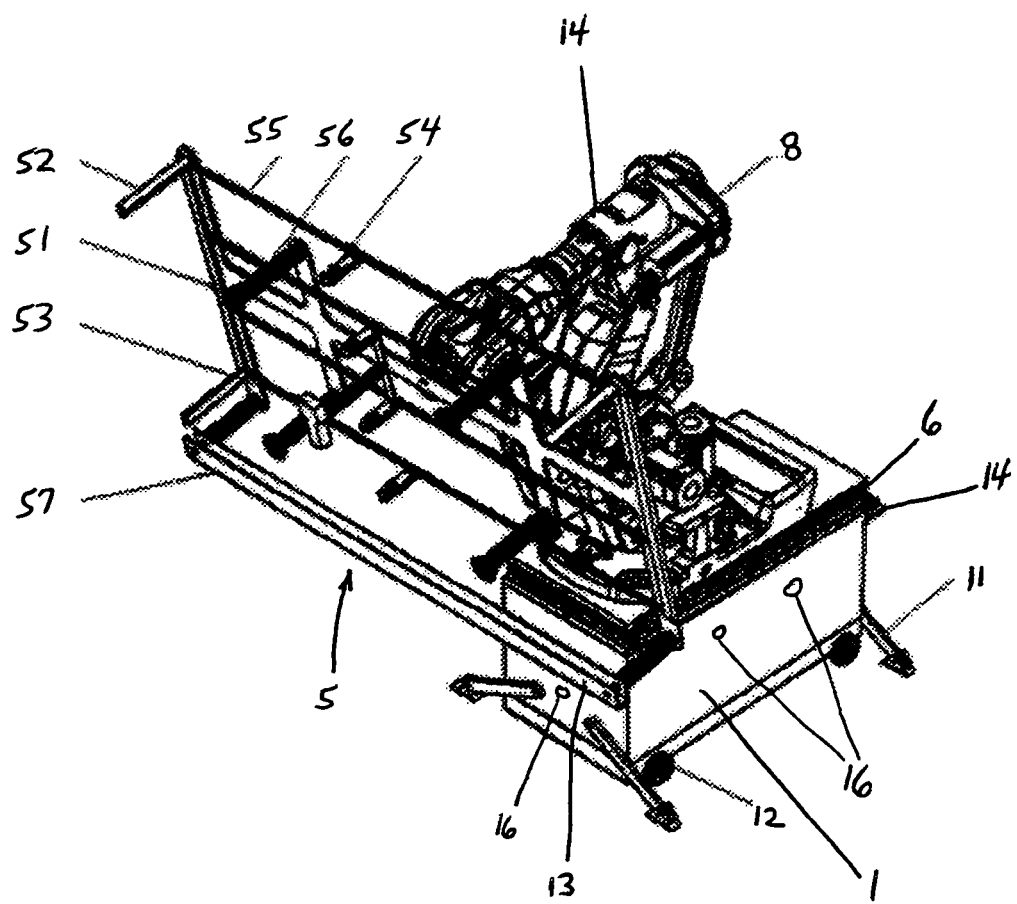
FIG. 4 is a corner view of the embodiment as shown in FIG. 3, displaced 90 degrees.
Figure 5:
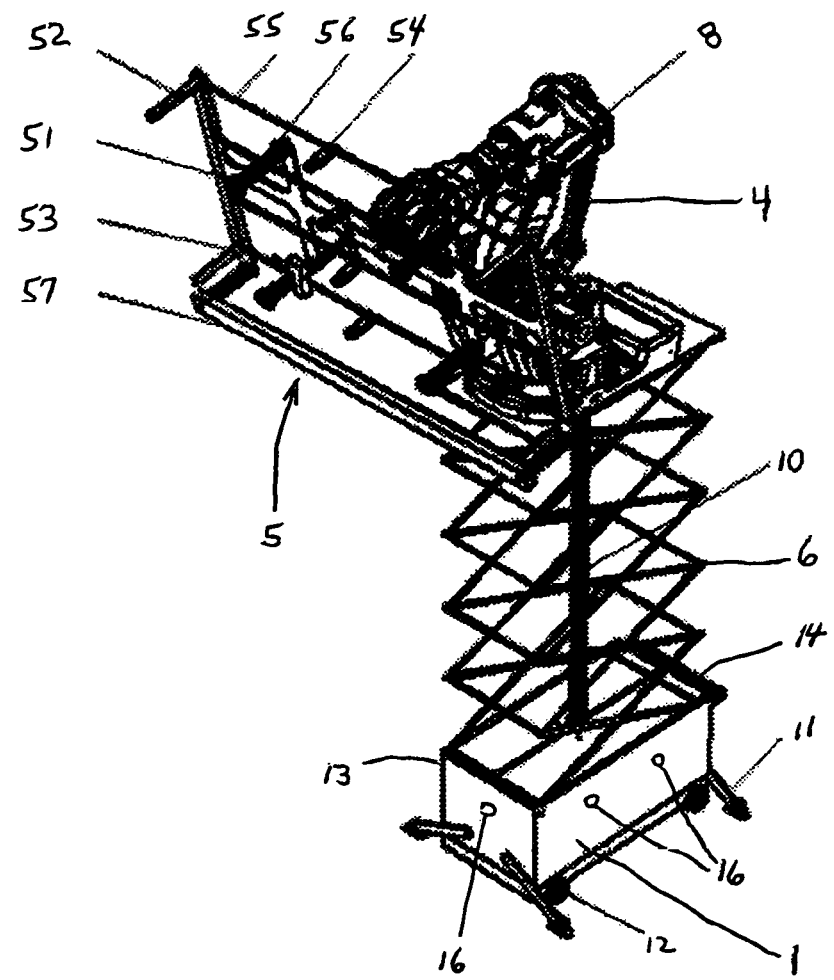
FIG. 5 is a corner view of the embodiment as shown in FIG. 4, with vertical extension.
Figure 6:
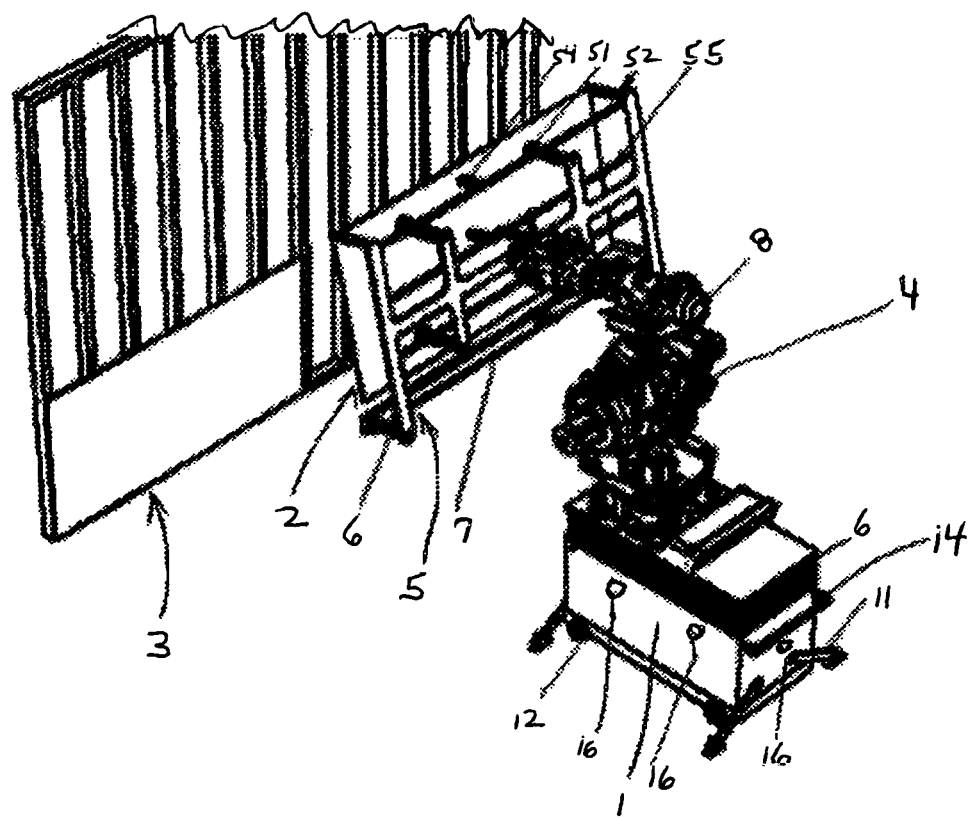
FIG. 6 is a side view of the embodiment as shown in FIG. 3 with construction board attached.

Various embodiments of the present invention include a frame 5 with attachment devices 12 to securely hold and subsequently affix to a substructure 3 a construction board 2, a robotic system 4 having multiple joints and links to position the frame 5, and a cart 1 containing ancillary equipment needed for the completion of the desired task and the ability to move and position the entire assembly under its own power.

Mounted to the end of the robot arm 4 is a device 51 to hold securely construction board 2, a device 53 to sense the location of studs in the wall 3 or roof 3 when the drywall 2 or sheathing 2 is correctly positioned, a device 55 to position and a device 54 to drive numerous screws or other fasteners through the material 2 and into the structure 3.

To assist a laborer with the mounting of boards 2, the robot arm 4 and cart 1 are capable of being easily maneuvered either through the use of integrated sensors that direct the actuation of the arm 4 and/or cart wheels 12 as determined by the push or pull of the operator on the device, a method of remote control, and/or independently with control software 7.

Frame

The frame 5 is available in different sizes to fit standard size pieces of drywall, sheathing, and/or other construction board 2. Mounted to the frame 5 are preferably vacuum suction cups 51 or other well-known devices capable of holding construction boards 2. The robotic arm 4 attaches to this frame 5. These holding devices 51 hold the board 2 tightly against the frame 5. Control signals to activate and maintain the board 2 against the holding devices 51 are initiated and terminated by a command from the human operator or control program. A linear compression system 56 ensures the holding devices 51 are in close contact with the board 2 before they are initiated. To prevent the dangerous possibility of a board 2 falling from a height in the case of power failure, the vacuum system 51 fails "closed" to maintain vacuum and continue to hold the board 2 for as long as possible. Additionally, the control software prevents movement of the robotic arm 4 and frame 5 if it is determined that the level of vacuum present is not great enough to secure the board 2. Some form of retractable catch mechanism 57 is also present to reduce the likelihood of a board 2 falling from the frame 5. Some embodiments may also have an auxiliary power supply to maintain functionality until the entire mechanism is in a safe position.

Attached to the frame 5 for the purpose of affixing the construction board 2 to the structure 3 is a mechanism 55 for locating and driving attachment devices, preferably screws or nails. A positioning mechanism 55 positions the powered screwdriver and screw feed 54, nail driver and nail feed system 54, or other attachment devices 54, according to sensor input or a predefined sequence of destinations and, at the request of the operator or control software 7, drives a screw or nail through the board 2 and into the structure 2. Such positioning mechanisms 55 are well known in the relevant art. Further, it is preferred that the frame 5 contain multiple screw/nail-driving mechanisms 54 on the frame 5 to allow for multiple screws/nails to be driven simultaneously.

The frame 5 also possesses sensors or extensions 52 to aid in positioning the frame 5 over a board 2 that is to be placed on a wall 3. This allows for the board 2 to be consistently positioned on the frame 5.

Screw/Nail Driving System

As described above, the preferred apparatus of attachment are screws or nails. Screw/nail driving tools and screw/nail loading mechanisms are well known in the relevant art, for example collated screw guns or nail guns. The attachment apparatus 54 is connected to a positioning system 55 that comprises a rail and a system for linear actuation that can be accurately position the driving tool 54 along the length of the rail.

The frame 5 preferably contains multiple rail/driver assemblies 54, 55; they may be oriented horizontally or vertically.

Once the board 2 is correctly positioned against the wall structure 3 where and to which it is to be attached, a control signal is given by either the operator or a control program 7. Then, the screw/nail driver 54 traverses the length of the rail and stops to drive a screw/nail either at predetermined intervals or when a sensor 53, preferably a stud finder, determines that the screw/nail driver is correctly positioned.

Arm

The arm 4 allows for translation and rotation in three dimensions, as appropriate. Additionally, the arm 4 must support the torsional and bending loads associated with the motions necessary for the construction board 2. One example of a prior art arm system is glass lift mechanisms used by window installers. Other prior art arm systems that may be utilized are included as part of the Reachmaster Winlet 770, GLG GlasLift 550, or KS Schulten Maschinenbau KS Robot 600. These arms 4 are combined with the frame 5 of the invention to comprise a complete system.

Cart and Platform

The preferred embodiment of the present invention include a combination of a wheeled cart 1 and a raisable platform 6. The platform 6 is preferably raised with either a scissor type lift or piston mechanism. The lower section comprising of a utility cart 1 to carry controllers 7, batteries and other support equipment, for the robotic arm 4, as well to provide storage and support for consumables that the robotic arm 4 uses.

There are preferably various combinations of cart 1 and platform 6 to accommodate both operating weight and reach considerations. The differing combinations ensure that the robotic arm 4 can fully reach the allocated work area within the fully retracted to fully extended platform 6 positions.

In addition, the cart 1 size and height is also coordinated with the need for maintaining a narrow enough width so as to be able to maneuver through doors and be transportable by standard building elevators.

The cart is also equipped with proximity sensors 13 so that operation of the robot 4 is halted if someone or something enters a possible "exclusion zone".

An embodiment of the cart 1 is equipped with electrically powered wheels 12 with an option to be pushed by manual means as well. The wheels 12 have automatic "chucks" that engage each time the unit is under electrical operation and is then stopped to prevent unintended movement of the cart 1 if there is a gradient in the floor on which the cart 1 sits. In manual-push mode, an interlock switch is engaged to allow operation of the wheels 12. The interlock switch 14 is accessible to the person pushing the unit and failing to push the switch results in the chucks being applied immediately. This configuration of the switch is known as "dead man" switch; it is well known in the relevant art.

Power for the operation of the wheels 12, controller 7, and robot 4 is through a combination of a primary utility or generator power through a standard 110/220 V socket and extension cord and a secondary on-board backup battery to provide a minimum safe run time and to power down the system to a safe condition in the event of a primary power loss. The power cord connecting the unit contains an automatic tension/retraction system so that the cord does not pose a tripping hazard to personnel or run afoul of the movement of the wheels. Such configurations are well known in the relevant art.

The cart 1 is preferably under the control of the robotic controller 7 so that the robot 3 and cart 1 act as an integral unit. In other embodiments, the cart 1 is remotely operated using the controller 7 or is able to be manually positioned. In practice, the exact mode is determined by the specific requirements of the application.

The cart 1 is preferably outfitted with motion stabilizers 11 and a system to prevent the wheels 12 from moving during operation. This stability prevents movement of the cart 1 while the robot 4 is working; such movement may negatively affect the accuracy of the work performed by the robot 4.

The cart wheels 12 are preferably independently controlled and may be omni-wheels or Mecanum wheels to allow for movement in all directions and the ability for the cart 1 to rotate.

Also, the cart controls 7 preferably have laser scanners and vision sensors 16 which allow for the detection of obstacles, people, or any relevant physical object and for any followup actions needed after such detection.

The platform 6 is the attachment point for the robotic arm 4. In some embodiments, the platform 6 also contains space for any consumables that have to be in proximity with the robotic arm 4 as well as a lifting portion to raise the arm 4. Power and any other supply lines to the platform are routed through the lifting mechanism. In some embodiments, the platform also contains a turret to rotate the arm 4. This turret is powered or manually driven.

In use, the controller 7 locates a construction board 2 in the robot's environment, utilizing the scanners and sensors 16. The robot arm 4 is maneuvered so that the frame 5 comes into proximity with the board 2. The board is then held to the frame 5 by the attachment devices 51.

The controller then determines the target location of the board, utilizing the scanners and sensors 16. Once location and pose information have been determined, the controller 7 begins the task of the planning the trajectory for the system. Traditional path planning techniques are used to determine an optimal trajectory. The controller 7 then takes the trajectory information and execute the plan to ensure that the system ends up at the appropriate position and pose.

The system is then moved into proximity with the target location. The board 2 is accurately lined up at the target location and then secured there.

This procedure may be repeated as long as desired by the operator.

Although this invention has been described with a certain degree of particularity, it is to be understood that the present disclosure has been made only by way of illustration and that numerous changes in the details of construction and arrangement of parts may be resorted to without departing from the spirit and scope of the invention.

What is claimed is:

1. A robot for transporting a board from a base position to a target position, positioning the board adjacent a substructure at the target position, and affixing the board to the substructure, the robot comprising:
    a cart comprising at least one wheel adapted to facilitate rolling movement of the cart over a surface;
    a platform mounted on the cart;
    a robot arm connected to the platform, the arm being configured to move in three dimensions;
    a frame connected near an end of the robotic arm, the frame comprising:
        at least one holding device comprising at least one vacuum suction cup for holding the board adjacent the frame;
        an attachment mechanism for attaching the board to the substructure, the attachment mechanism comprising:
            at least one rail disposed horizontally relative to the frame;
            a driving tool disposed on the at least one rail for driving one or more fasteners through the board into the substructure; and
            at least one sensor for sensing one or more locations of one or more studs in the substructure; and
    a controller configured to communicate with the cart, platform, the arm, and the frame, wherein the controller is configured for:
        activating that at least one vacuum suction cup to hold the board adjacent the frame;
        causing the robotic arm to position the frame and the board adjacent the substructure;
        causing the driving tool to traverse the at least one rail;
        using the at least one sensor to sense the location of the one or more studs in the substructure; and
        as the driving tool traverses the at least one rail, causing the driving tool to drive the one or more fasteners through the board into the substructure at each of the one or more locations of the one or more studs.

2. The robot as described in claim 1, wherein the robot comprises laser scanners and optical sensors for providing a plurality of observations to the controller.

3. The robot as described in claim 2, wherein the controller determines a path between the base position and the target position based upon the observations.

4. The robot as described in claim 1, wherein the board is drywall.

5. The robot as described in claim 1, wherein the board is sheathing.

6. The robot as described in claim 1, wherein the board is plywood.

7. A method for transporting a board from a base position to a target position and installing the board on a substructure at the target position, the method comprising the steps of:
    obtaining a robot comprising:
        a cart comprising at least one wheel adapted to facilitate rolling movement of the cart over a surface;
        a platform mounted on the cart;
        a robot arm connected to the platform, the robot arm being configured to move in three dimensions;
        a frame connected near an end of the robot arm, the frame comprising:
            at least one holding device comprising at least one vacuum suction cup for holding the board adjacent the frame;
            an attachment mechanism for attaching the board to the substructure, the attachment mechanism comprising:
                at least one rail disposed horizontally relative to the frame;
                a driving tool disposed on the at least one rail for driving one or more fasteners through the board into the substructure;
                a positioning mechanism for adjusting a position of the driving tool along the at least one rail; and
                at least one sensor for sensing one or more locations of one or more studs in the substructure; and
            laser scanners and optical sensors for providing a plurality of observations to a controller; and
        the controller configured to communicate with the cart, the platform, the arm, and the frame, wherein the controller is configured for:
            activating that at least one vacuum suction cup to hold the board adjacent the frame;
            causing the robot arm to position the frame and the board adjacent the substructure;
            causing the driving tool to traverse the at least one rail;
            using the at least one sensor to sense the location of the one or more studs in the substructure; and
            as the driving tool traverses the at least one rail, causing the driving tool to drive the one or more fasteners through the board into the substructure at each of the one or more locations of the one or more studs;
    determining, by the controller, a path between the base position and the target position based upon the observations;
    moving, by the controller, the robot proximate to the base position;
    attaching, by the controller, the board to the frame via the at least one vacuum suction cup;
    moving, by the controller, the robot proximate to the target position by following the path; and
    installing, by the controller, the board on the substructure at the target position using the driving tool.

8. The robot of claim 1, wherein:
    the at least one rail comprises a first rail and a second rail disposed parallel to and spaced apart from the first rail on the frame;
    the driving tool is a first driving tool disposed on the first rail;

the attachment mechanism further comprises a second driving tool disposed on the second rail; and the positioning mechanism is configured to adjust the position of the first driving tool along the first rail and the second driving tool along the second rail.

9. The robot of claim 8, wherein the frame is rectangular.

10. The robot of claim 8, wherein the at least one holding device comprises four holding devices, each of the four holding devices comprising a respective vacuum suction cup for holding the board adjacent the frame.

11. The robot of claim 8, wherein the first rail and the second rail extend from a first end of the frame to a second end of the frame.

12. A construction board installation robot comprising:
at least one wheel adapted to facilitate rolling movement of the construction board installation robot over a surface;
a robot arm configured to translate and rotate in three dimensions;
a rectangular frame disposed adjacent an end of the robot arm, the rectangular frame defining a first end and a second end and comprising:
  a plurality of vacuum suction cups configured for holding a construction board adjacent a face of the frame;
  a first rail that extends perpendicularly from the first end of the frame to the second end of the frame;
  a second rail that is parallel to and spaced apart from the first rail and extends from the first end of the frame to the second end of the frame;
  a first driving tool configured for driving one or more fasteners through the construction board into a substructure, the first driving tool being disposed on the first rail;
  a second driving tool configured for driving one or more fasteners through the construction board into the substructure, the second driving tool being disposed on the second rail;
  a positioning mechanism for adjusting a position of the first driving tool along the first rail and a position of the second driving tool along the second rail; and
at least one stud finder configured to sense one or more locations of one or more studs in the substructure; and
a controller configured to communicate with the robot arm and the frame, wherein the controller is configured to:
  activate the plurality of vacuum suction cups to maintain the construction board adjacent the face of the frame;
  operate the robot arm to position, through translation and rotation of the robot arm, the frame and the construction board adjacent the substructure;
  operate the positioning mechanism to cause the first driving tool to traverse the first rail and the second driving tool to traverse the second rail;
  sensing the one or more locations of the one or more studs in the substructure using the at least one stud finder; and
  operating the first driving tool and the second driving tool to drive the one or more fasteners through the board into the substructure at each of the one or more locations of the one or more studs as the first driving tool traverses the first rail and the second driving tool traverses the second rail.

13. The construction board installation robot of claim 12, wherein the first driving tool and the second driving tool comprise a collated screw gun.

14. The construction board installation robot of claim 12, further comprising a vacuum system configured to maintain a vacuum between the construction board and the plurality of vacuum suction cups.

15. The construction board installation robot of claim 12, wherein the frame further comprises a retractable catch mechanism disposed adjacent a based portion of the frame.

16. The construction board installation robot of claim 12, wherein the positioning mechanism comprising a linear actuation system.

* * * * *